(12) United States Patent
Mueller et al.

(10) Patent No.: US 10,882,612 B2
(45) Date of Patent: Jan. 5, 2021

(54) MAST BEARING SYSTEM FOR A TILTROTOR AIRCRAFT

(71) Applicant: Textron Innovations Inc., Fort Worth, TX (US)

(72) Inventors: Russell L. Mueller, Coppell, TX (US); Tyson T. Henry, Arlington, TX (US); Ezra M. Tiprigan, North Richland Hills, TX (US)

(73) Assignee: TEXTRON INNOVATIONS INC., Fort Worth, TX (US)

(*) Notice: Subject to any disclaimer, the term of this patent is extended or adjusted under 35 U.S.C. 154(b) by 0 days.

(21) Appl. No.: 16/678,938

(22) Filed: Nov. 8, 2019

(65) Prior Publication Data

US 2020/0189730 A1 Jun. 18, 2020

Related U.S. Application Data

(62) Division of application No. 16/049,553, filed on Jul. 30, 2018, now Pat. No. 10,654,569.

(51) Int. Cl.
*F16C 19/36* (2006.01)
*F16C 33/34* (2006.01)
(Continued)

(52) U.S. Cl.
CPC ........ *B64C 29/0033* (2013.01); *F16C 19/361* (2013.01); *F16C 19/364* (2013.01);
(Continued)

(58) Field of Classification Search
CPC .... F16C 19/361; F16C 19/364; F16C 19/385; F16C 25/083; F16C 33/34; F16C 33/366;
(Continued)

(56) References Cited

U.S. PATENT DOCUMENTS 2,606,361 A * 8/1952 Keller .................. F16C 35/061
29/898.09
2,609,065 A * 9/1952 Douglas ................. F01D 25/18
184/6.11
(Continued)

FOREIGN PATENT DOCUMENTS

CN 201971153 U * 9/2011 ............. B64C 25/36
CN 103748372 A * 4/2014 .......... F16C 33/3843
(Continued)

OTHER PUBLICATIONS

Gilbert J. Weden and John J. Coy, "Summary of Drive-Train Component Technology in Helicopters," Propulsion Laboratory, AVSCOM Research and Technology Laboratories, Lewis Research Center, Cleveland, OH 44135, NASA Technical Memorandum 83726, USAAVSCOM Technical Report 84-C-10, prepared for the NATO-AGARD PEP Sixty-fourth Symposium on Gears and Power Transmissions for Helicopters and Turboprops Lisbon, Portugal, Oct. 8-12, 1984, 25 pages; https://ntrs.nasa.gov/archive/nasa/casi.ntrs.nasa.gov/19840022225.pdf.
(Continued)

*Primary Examiner* — Marcus Charles
(74) *Attorney, Agent, or Firm* — Patent Capital Group

(57) ABSTRACT

A tiltrotor aircraft may be provided and may include a mast assembly, in which the mast assembly may include a mast; a bearing system; a housing; and a housing cap secured to the housing, wherein the bearing system is between the mast and the housing. The bearing system may further include a first bearing assembly including a first inner race, a first outer race, and a plurality of first tapered roller bearings; a second bearing assembly including a second inner race, a second outer race, and a plurality of second tapered roller bearings; an inner spacer and an outer spacer in which the inner and outer spacers are between the first and second bearing assemblies; and a retaining device in which the retaining device and the housing cap provide, at least in part, pre-loading for the first and second bearing assemblies.

7 Claims, 10 Drawing Sheets

(51) Int. Cl.
*F16C 33/46* (2006.01)
*F16C 25/08* (2006.01)
*B64D 35/00* (2006.01)
*B64C 29/00* (2006.01)
*F16C 43/06* (2006.01)

(52) U.S. Cl.
CPC ............ *F16C 25/083* (2013.01); *F16C 33/34* (2013.01); *F16C 33/467* (2013.01); *F16C 33/4623* (2013.01); *F16C 43/065* (2013.01); *B64D 35/00* (2013.01); *F16C 2326/06* (2013.01); *F16C 2326/43* (2013.01)

(58) Field of Classification Search
CPC .. F16C 33/4623; F16C 33/467; F16C 35/062; F16C 43/065; F16C 2326/06; F16C 2326/43; B64C 29/0033; B64D 35/00
USPC ......... 384/91, 551, 563, 565, 669, 571, 584, 384/569
See application file for complete search history.

(56) References Cited

U.S. PATENT DOCUMENTS

| | | | |
|---|---|---|---|
| 2,874,803 A * | 2/1959 | Gunberg | F01D 25/18 184/6.11 |
| 3,035,789 A | 5/1962 | Young | |
| 5,421,656 A | 6/1995 | Chory et al. | |
| 7,036,391 B2 | 5/2006 | Tsuchiya et al. | |
| 8,276,840 B2 * | 10/2012 | Karem | B64C 29/0033 244/60 |
| 9,856,029 B2 | 1/2018 | King et al. | |
| 9,874,245 B2 * | 1/2018 | Lemmers, Jr. | F16C 19/525 |
| 2014/0050433 A1 | 2/2014 | Dittmar et al. | |
| 2016/0122039 A1 * | 5/2016 | Ehinger | B64D 35/00 416/170 R |
| 2018/0245630 A1 * | 8/2018 | Takaoka | F16C 35/067 |
| 2018/0334923 A1 * | 11/2018 | Leeder | F16C 33/581 |

FOREIGN PATENT DOCUMENTS

| | | | | |
|---|---|---|---|---|
| CN | 106989925 A | * | 7/2017 | ............ G01M 13/04 |
| CN | 108238238 A | * | 7/2018 | ............ B64C 25/405 |
| WO | WO-2007115465 A1 | * | 10/2007 | ............ B64C 27/16 |
| WO | WO-2014010634 A1 | * | 1/2014 | ............... B64C 5/12 |
| WO | WO-2016080014 A1 | * | 5/2016 | ........... F16J 15/3492 |

OTHER PUBLICATIONS

Gonzales, Carlos, "What's the Difference Between Bearings?," MachineDesign, Aug. 26, 2015, 17 pages; https://www.machinedesign.com/whats-difference-between/what-s-difference-between-bearings-1.

Wikipedia, "Tapered roller bearing," retrieved and printed Jun. 20, 2018, 3 pages; https://en.wikipedia.org/wiki/Tapered_roller_bearing.

* cited by examiner

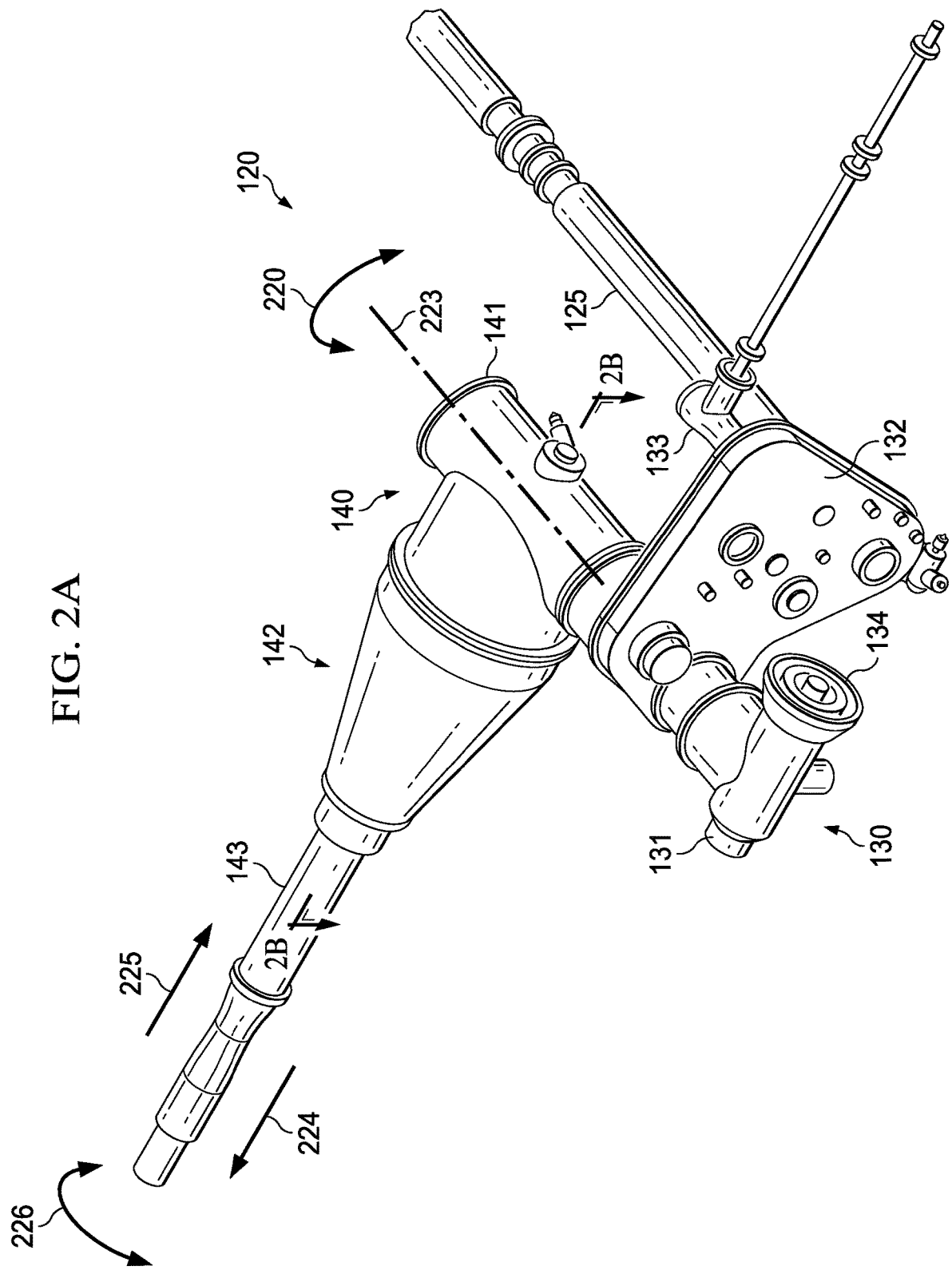

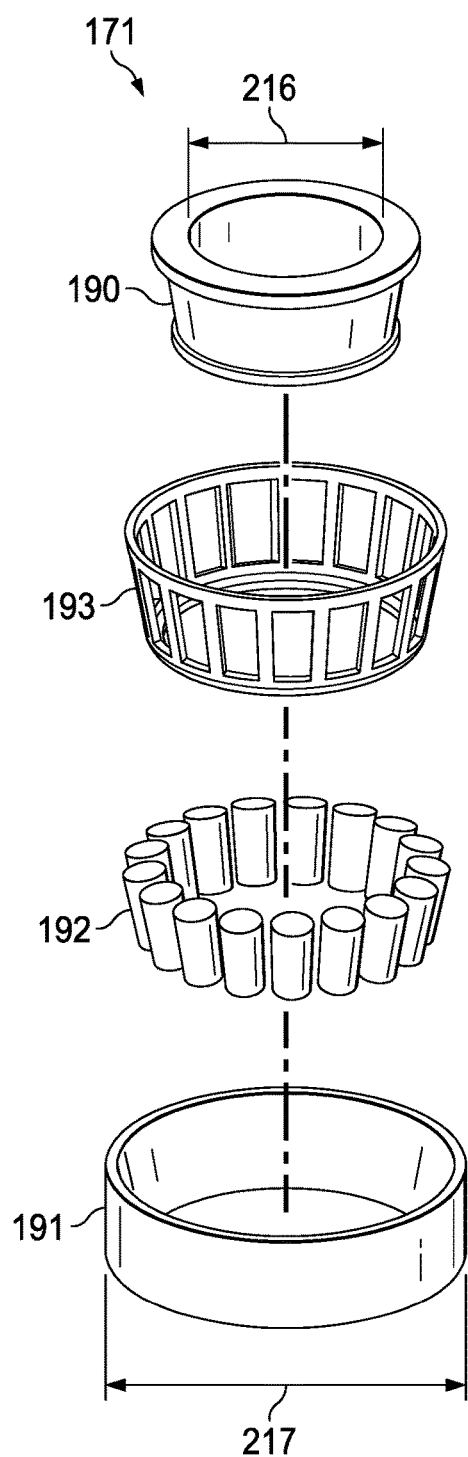
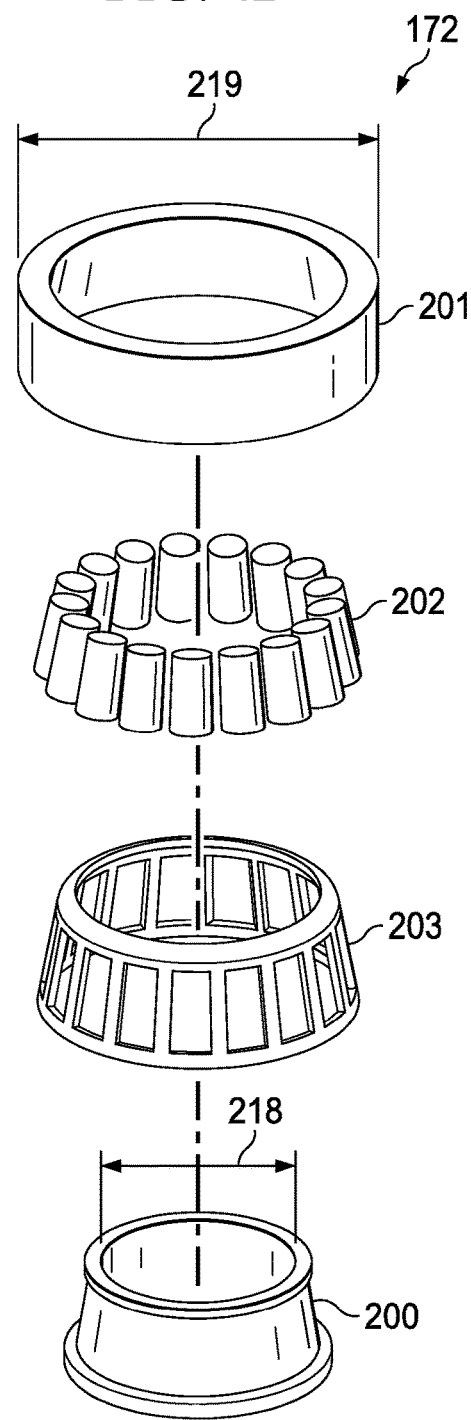
FIG. 4A
FIG. 4B

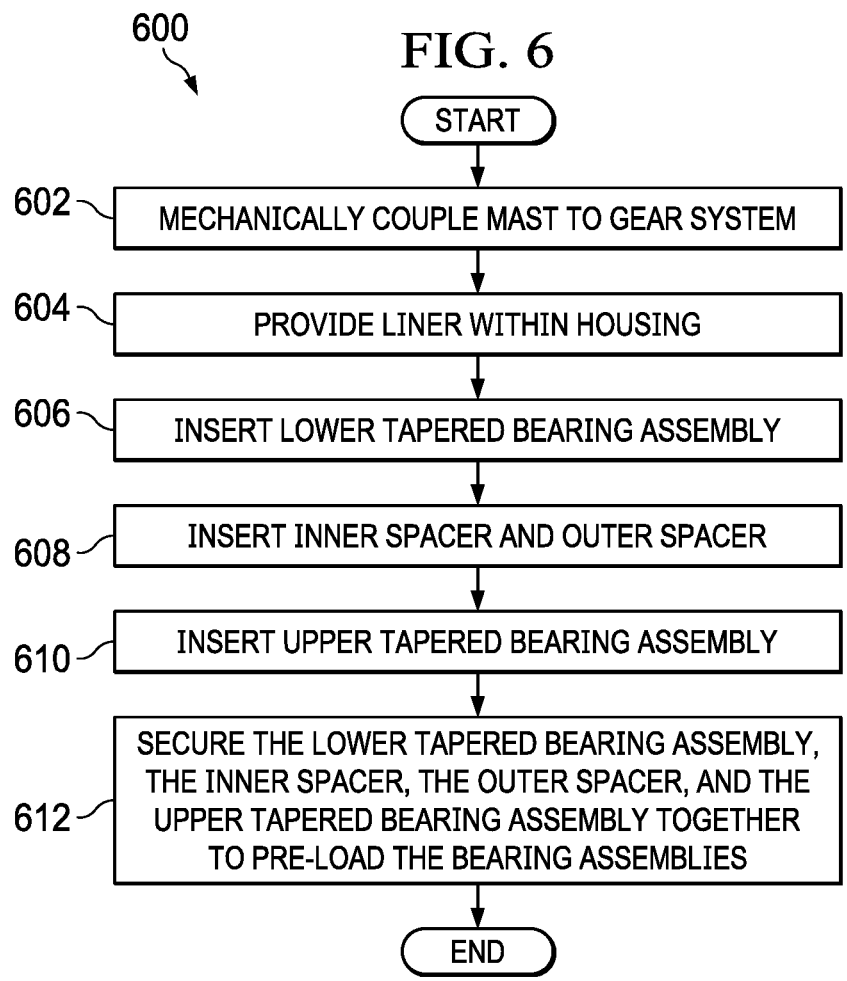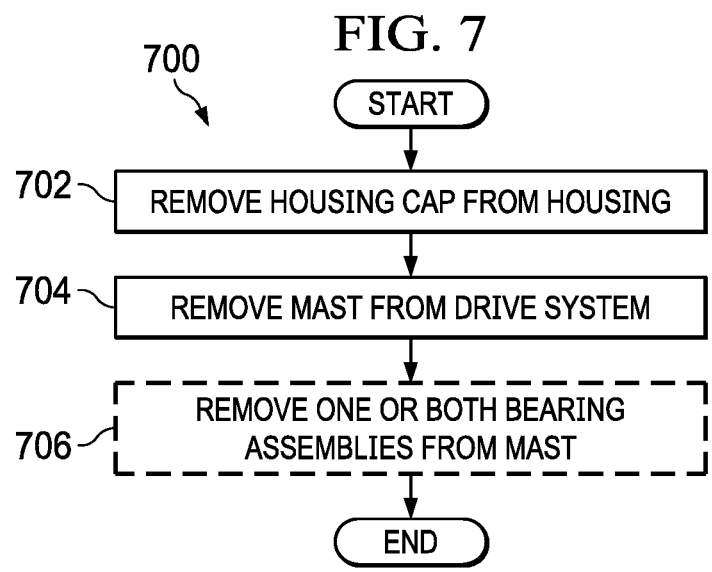

MAST BEARING SYSTEM FOR A TILTROTOR AIRCRAFT

CROSS-REFERENCE TO RELATED APPLICATION

This application is a divisional and claims the benefit of priority under 35 U.S.C. § 120 of U.S. application Ser. No. 16/049,553, filed on Jul. 30, 2018, entitled "MAST BEARING SYSTEM FOR A TILTROTOR AIRCRAFT," Inventor Russell L. Mueller, issued as U.S. Pat. No. 10,654,569 B2 on May 19, 2020. The disclosure of the prior application is considered part of and is incorporated in its entirety by reference in the disclosure of this application.

TECHNICAL FIELD

This disclosure relates in general to the field of aircraft and, more particularly, though not exclusively, to a mast bearing system for a tiltrotor aircraft.

BACKGROUND

There are numerous considerations involved in the design of tiltrotor aircraft and other aircraft, including size, weight, power efficiency, fuel efficiency, noise, vibration, structural loads, and so forth. In many cases, however, it may be challenging to improve certain aspects of an aircraft without disrupting other aspects. For example, design for an aircraft propulsion system can implicate numerous performance considerations and is often an extremely challenging aspect of aircraft design.

SUMMARY

According to one aspect of the present disclosure, a tiltrotor aircraft may be provided and may include a mast assembly, in which the mast assembly may include a mast; a bearing system; a housing; and a housing cap secured to the housing, wherein the bearing system is between the mast and the housing. The bearing system may further include a first bearing assembly comprising a first inner race, a first outer race, and a plurality of first tapered roller bearings; a second bearing assembly comprising a second inner race, a second outer race, and a plurality of second tapered roller bearings; an inner spacer; an outer spacer, wherein the inner spacer and the outer spacer are between the first bearing assembly and the second bearing assembly; and a retaining device, wherein the retaining device secures the first inner race, the second inner race, and the inner spacer together, and the housing cap secures the first outer race, the second outer race, and the outer spacer together.

In at least one instance, the first outer race may include a front face and a back face, the second outer race comprises a front face and a back face, and the outer spacer is in contact with the back face of the first outer race and the back face of the second outer race. In at least one instance, the first inner race may include a front face and a back face, the second inner race comprises a front face and a back face, and the inner spacer is in contact with the front face of the first inner race and the front face of the second inner race. In at least one case, the front face of the first outer race may be in contact with the housing cap. In at least one case, the back face of the second inner race is in contact with a retaining structure of the mast. In some cases, the first plurality of tapered roller bearings and the second plurality of tapered roller bearings may be a same size. In other cases, the first plurality of tapered roller bearings and the second plurality of tapered roller bearings may be a different size.

The bearing system may further include a liner between the housing and each of the first outer race and the second outer race. In at least one instance, the liner may further include a flange that is between the housing cap and the housing; and a retaining structure, wherein the front face of the second outer race is in contact with the retaining structure. In at least one instance, the mast and the bearing system can be assembled through a top side of the housing. In at least one instance, the mast and the bearing system can be removed from a top side of the housing.

According to another aspect of the present disclosure, a method of assembling a bearing system for a mast of a tiltrotor aircraft may be provided and may include coupling the mast to a gear system of a gearbox of the tiltrotor aircraft; providing a liner between the mast and a housing, wherein the liner comprises an upper flange that extends outward away from the mast and a lower retaining structure that extends inward toward the mast; inserting a lower tapered bearing assembly between the liner and the mast; inserting an inner spacer and an outer spacer between the liner and the mast; inserting an upper tapered bearing assembly between the liner and the mast; and securing the lower tapered bearing assembly, the inner spacer, the outer spacer, and the upper tapered bearing assembly together. In at least one case, each of inserting the lower tapered bearing assembly, inserting an inner spacer and an outer spacer, and inserting the upper tapered bearing assembly are performed from a top side of the housing.

In at least one instance, the lower tapered bearing assembly may include an inner race and an outer race in which the inner race may be in contact with a retaining structure of the mast and the outer race may be in contact with the lower retaining structure of the liner. In at least one instance, the upper tapered bearing assembly may include an inner race and an outer race. In at least one case, the securing may further include: securing a retaining device to the mast, wherein the retaining device is in contact with the inner race of the upper tapered bearing assembly; and securing a housing cap to the housing, wherein the housing cap is in contact with the outer race of the upper tapered bearing assembly. In such a case, the inner spacer may be in contact with the inner race of the lower tapered bearing assembly and the inner race of the upper tapered bearing assembly. The outer spacer may be in contact with the outer race of the lower tapered bearing assembly and the outer race of the upper tapered bearing assembly.

According to another aspect of the present disclosure, a method of removing a mast of a drive system of a tiltrotor aircraft may be provided and may include removing a housing cap from a housing of the drive system; and removing the mast from the drive system. In at least one case, removing the mast may remove an upper tapered bearing assembly and a lower tapered bearing assembly from the housing.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIGS. 2A-2B are simplified diagrams illustrating example details associated with a drive system of the aircraft, in accordance with certain embodiments.

FIGS. 4A-4B are simplified exploded view diagrams illustrating example details associated with bearing assemblies of the mast assembly, in accordance with certain embodiments.

FIG. 6 is a simplified flowchart illustrating example details associated with assembling a mast bearing system for the mast assembly, in accordance with certain embodiments.

FIG. 7 is a simplified flowchart illustrating example details associated with removing a mast from the drive system, in accordance with certain embodiments.

DETAILED DESCRIPTION

Figure 1A:
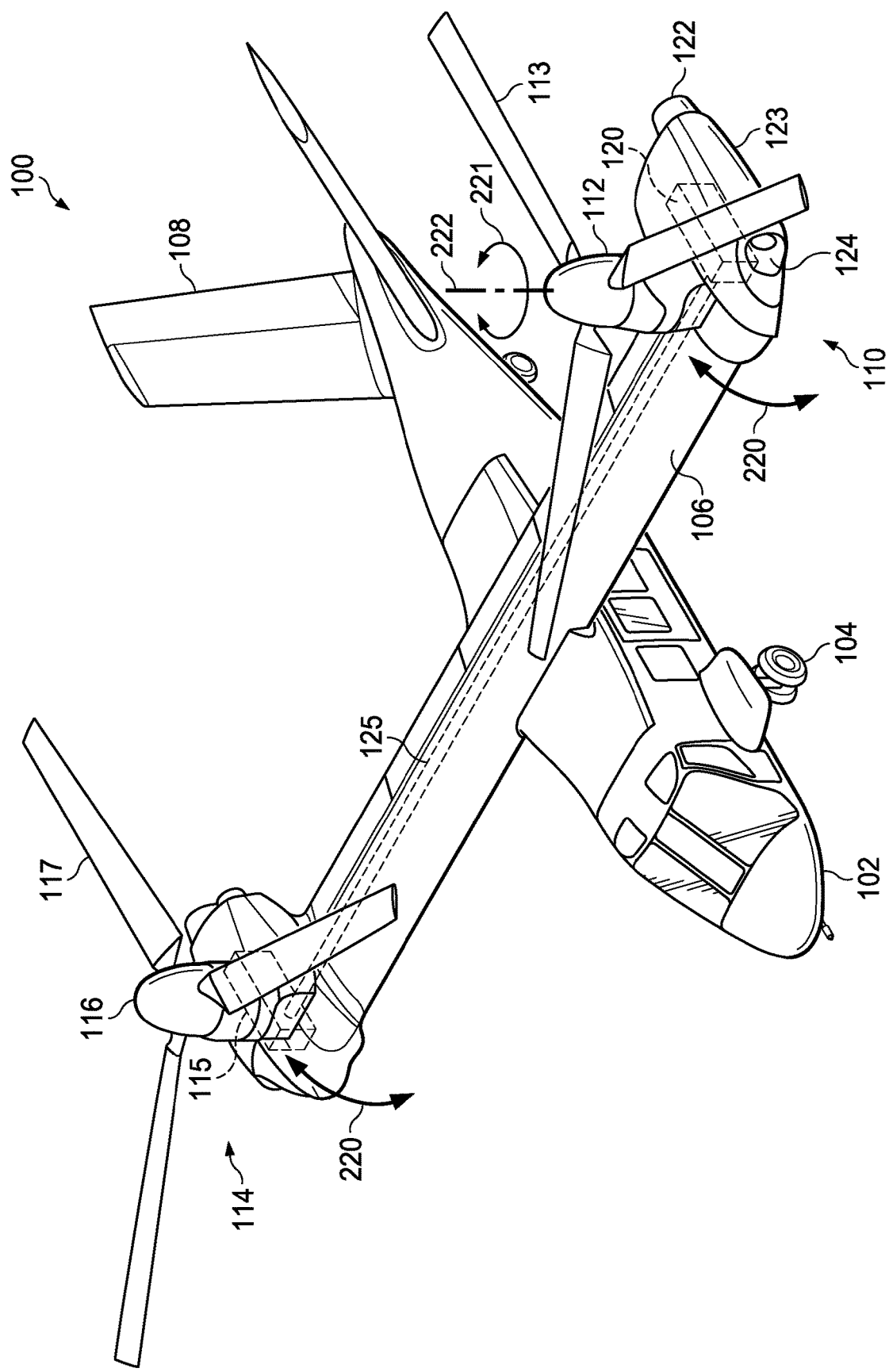
FIGS. 1A-1B are simplified schematic diagrams of example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase 'between X and Y' represents a range that includes X and Y.

Additionally, as referred to herein in this Specification, the terms 'forward', 'aft', 'inboard', and 'outboard' may be used to describe relative relationship(s) between components and/or spatial orientation of aspect(s) of a component or components. The term 'forward' may refer to a spatial direction that is closer to a front of an aircraft relative to another component or component aspect(s). The term 'aft' may refer to a spatial direction that is closer to a rear of an aircraft relative to another component or component aspect(s). The term 'inboard' may refer to a location of a component that is within the fuselage of an aircraft and/or a spatial direction that is closer to or along a centerline of the aircraft relative to another component or component aspect, wherein the centerline runs in a between the front and the rear of the aircraft. The term 'outboard' may refer to a location of a component that is outside the fuselage of an aircraft and/or a spatial direction that farther from the centerline of the aircraft relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1B:
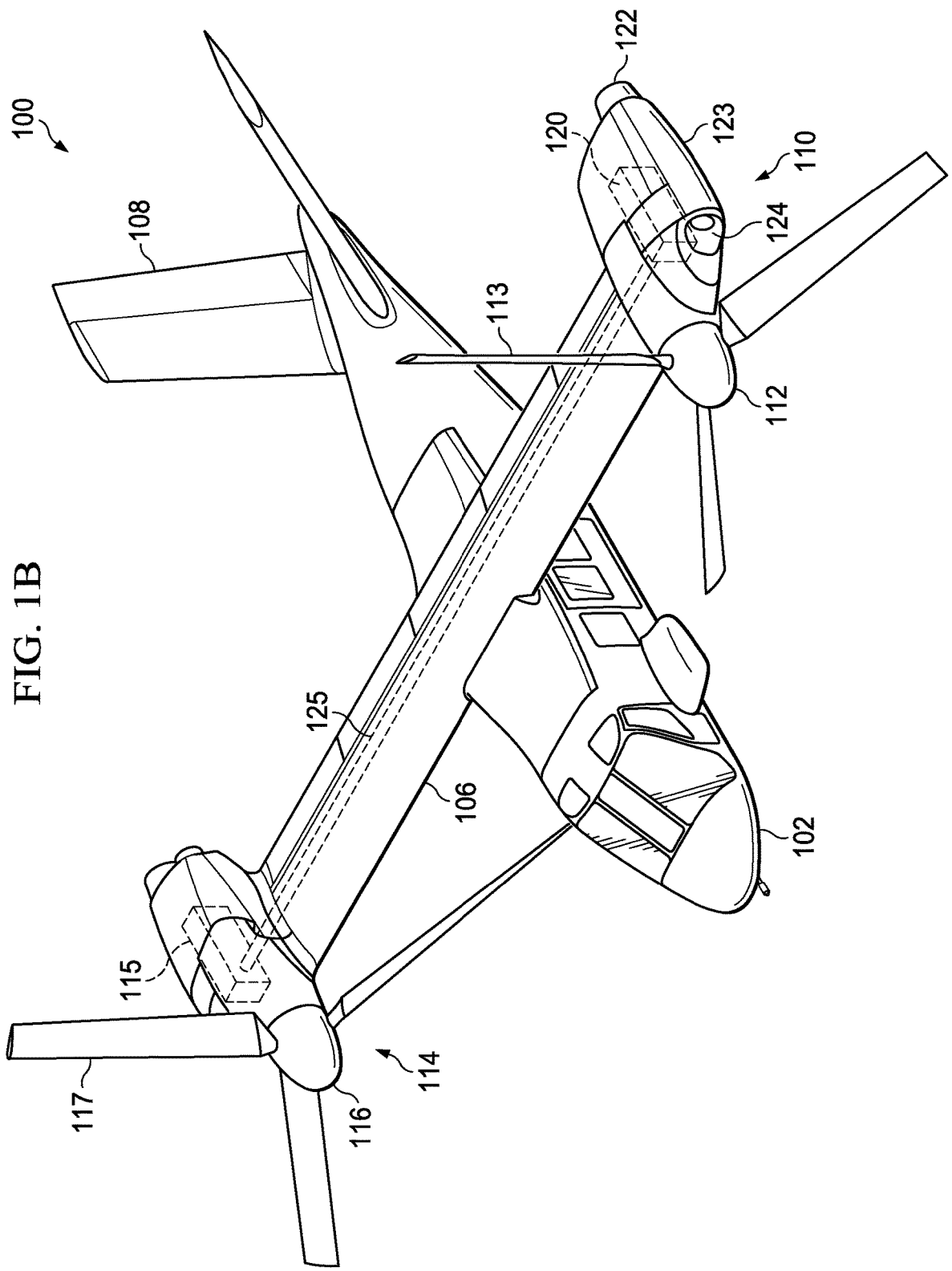

Referring to FIGS. 1A-1B, FIGS. 1A-1B illustrate perspective views of an example aircraft, which in this example is a tiltrotor aircraft 100. Tiltrotor aircraft 100 includes a fuselage 102, a landing gear 104, a wing 106, a tail member 108, a propulsion system 110, and a propulsion system 114. The fuselage 102 is the main body of the tiltrotor aircraft 100, which may include a cabin (e.g., for crew, passengers, and/or cargo) and/or may house certain mechanical and electrical components for tiltrotor aircraft 100. In the illustrated embodiment, tail member 108 may be used as a vertical stabilizer.

Propulsion system 110 includes a drive system 120 and a proprotor 112 that includes a plurality of rotor blades 113. Propulsion system 114 includes a drive system 115 and a proprotor 116 that includes a plurality of rotor blades 117. The position of proprotors 112 and 116, as well as the pitch of rotor blades 113 and 117, can be selectively controlled in order to provide flight capabilities (e.g., flight direction, thrust, and/or lift) for tiltrotor aircraft 100.

The position of proprotors 112 and 116 are rotatable (generally indicated by arrows 220) between a helicopter mode position and an airplane mode position to provide different types of thrust for tiltrotor aircraft 100. FIG. 1A illustrates tiltrotor aircraft 100 in helicopter mode in which proprotors 112 and 116 are positioned substantially vertical to provide a lifting thrust. FIG. 1B illustrates tiltrotor aircraft 100 in an airplane mode in which proprotors 112 and 116 are positioned substantially horizontal to provide a forward thrust in which a lifting force is supplied by wing 106. It should be appreciated that tiltrotor aircraft can be operated such that proprotors 112 and 116 can be selectively positioned between airplane mode and helicopter mode, which can be referred to as a conversion mode.

Propulsion systems 110 and 114 are illustrated in the context of tiltrotor aircraft 100; however, propulsion systems 110 and 114 can be implemented on other tiltrotor aircraft. For example, an alternative embodiment may include a quad tiltrotor that has an additional wing member aft of wing 106 and the additional wing member may have additional propulsion systems similar to propulsion systems 110 and 114. In another embodiment, propulsion systems 110 and 114 can be used with an unmanned version of tiltrotor aircraft 100. Further, propulsion systems 110 and 114 can be integrated into a variety of tiltrotor aircraft configurations.

Features of propulsion system 110 are substantially symmetric to features of propulsion system 114; therefore, for sake of efficiency, certain features will be discussed only with regard to propulsion system 110. However, one of ordinary skill in the art would fully appreciate an understanding of propulsion system 114 based upon embodiments described herein for propulsion system 110.

Various engine(s), gearbox(es), and drive shaft(s) may be provided in various configurations to provide torque to proprotors 112 and 116. For example, in at least one embodiment, propulsion system 110 may include drive system 120 and an engine 122 within an engine nacelle 123 in which engine 122 is mechanically coupled to drive system 120 via an interconnect gearbox to provide torque to proprotor 112 to facilitate various flight capabilities. Engine 122 may be housed and supported within engine nacelle 123. Drive system 120 may be further mechanically coupled to an interconnect drive shaft 125. Interconnect drive shaft 125 may provide a torque path that enables a single engine to provide torque to both proprotors 112 and 116 in the event of a failure of the other engine. In at least one embodiment, engine nacelle 123 may include an inlet 124, aerodynamic fairings, and exhaust, as well as other structures and systems to support and facilitate the operation of engine 122.

Tiltrotor aircraft 100 and propulsion system 110 may be subjected to various aerodynamic and operational forces during operation such as thrust or torque loads, aerodynamic shears, and so forth. Thrust or torque loads, for example, are forces produced by the rotation (generally indicated by arrows 221, which may be clockwise or counterclockwise) of proprotor 112 about a mast axis (generally indicated by dashed line 222) that is collinear with the rotational center of proprotor 112. The rotation 221 may cause the proprotor 112 and components of drive system 120 to be subjected to bending forces about the mast axis 222 in airplane mode and helicopter mode positions as various maneuvers are executed for the tiltrotor aircraft 100.

Unlike conventional rotorcrafts, such as helicopters, thrust loads for propulsion systems of a tiltrotor aircraft (e.g., tiltrotor aircraft 100) can be reversible in flight, such that positive or negative thrust can be dynamically generated by the propulsion systems to execute various flight maneuvers for the tiltrotor aircraft that could typically not be executed for a conventional rotorcraft. For example, in some cases, thrust may be dynamically varied to execute banking turns for a tiltrotor aircraft. In another example, thrust may be dynamically varied to execute steep climbs (sometimes referred to as 'yank' maneuvers) for a tiltrotor aircraft. In still another example, thrust may be dynamically varied to execute both yank and bank maneuvers for a tiltrotor aircraft.

The ability to support dynamic maneuverability for a tiltrotor aircraft and various loads that may be caused by dynamic maneuvers can implicate numerous considerations for propulsion system design (e.g., performance considerations, manufacturing considerations, etc.), which can include weight, damage or wear rate, cost, part count, ease of repair, among others, and can be a challenging aspect of tiltrotor aircraft design.

Figure 2B:
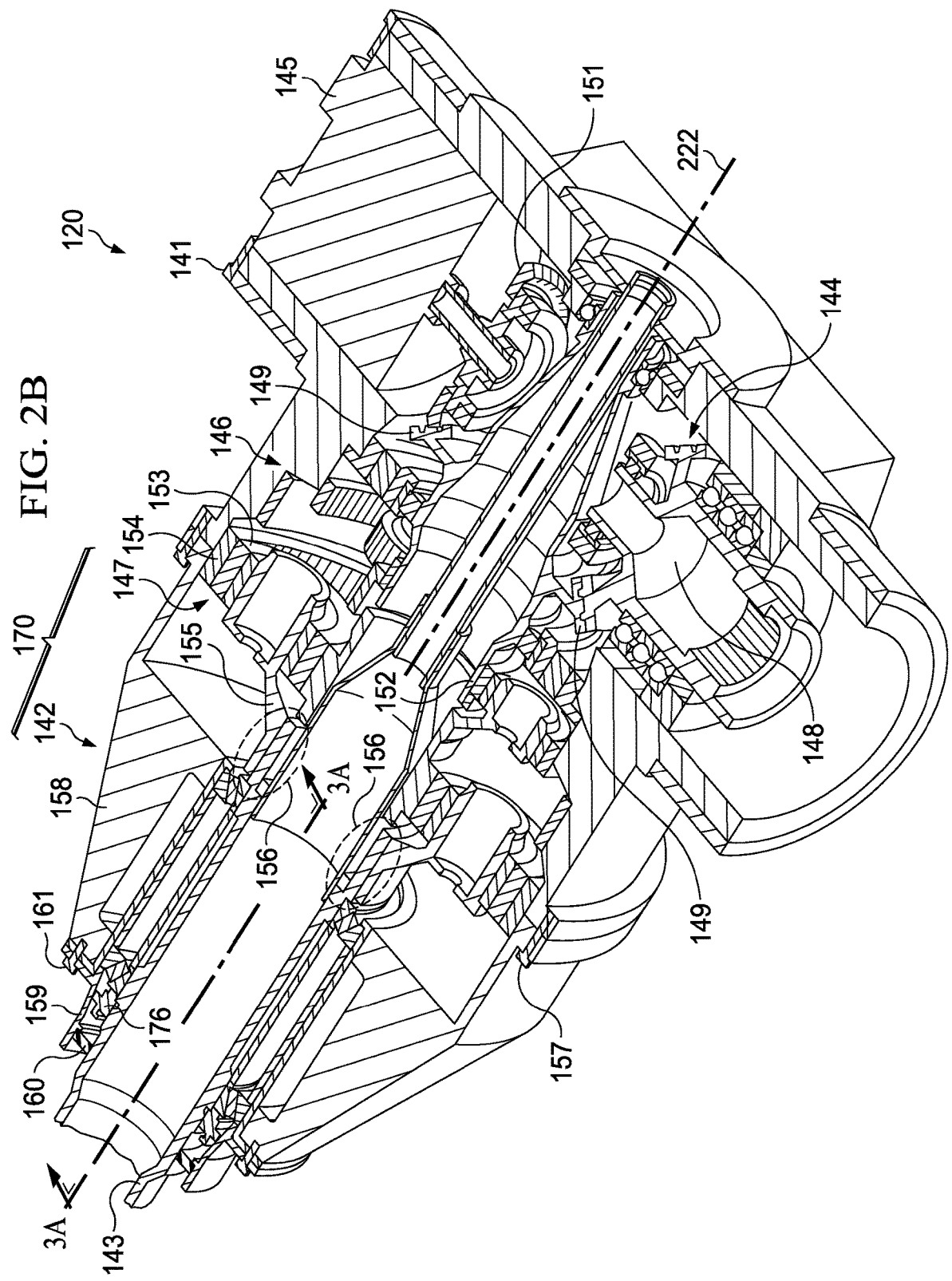

Referring to FIGS. 2A-2B, FIGS. 2A-2B are simplified diagrams illustrating example details associated with drive system 120, in accordance with certain embodiments. In particular, FIG. 2A is a simplified perspective view diagram illustrating example details associated with drive system 120.

Referring to FIG. 2A, FIG. 2A is a simplified schematic diagram illustrating example details associated with a drive system 120, in accordance with certain embodiments. In at least one embodiment, drive system 120 may include a first gearbox assembly 130 and a second gearbox assembly 140. First gearbox assembly 130 may include a spiral bevel gearbox 131, an interconnect gearbox 132, and a blower gearbox 133. Second gearbox assembly 140 may include a proprotor gearbox 141 and a mast assembly 142, which may include a mast 143.

Engine 122 (not shown in FIG. 2A) may be fixed relative to wing 106 of aircraft 100 and may be mechanically coupled to an input 134 of spiral bevel gearbox 131 via an engine output shaft (not shown) to provide torque to first gearbox assembly 130 during operation. Spiral bevel gearbox 131 may include spiral bevel gears to change torque direction of the torque input from the engine by approximately ninety degrees and input the torque to interconnect gearbox 132 via a clutch. Interconnect gearbox 132 may include various gears, such as helical gears, pinions, etc. in a gear train that is mechanically coupled to interconnect drive shaft 125, blower gearbox 133, and second gearbox assembly 140 (via proprotor gearbox 141) to distribute torque and provide mechanical power among the components. In various embodiments, interconnect gearbox may also be configured to provide mechanical power to various system accessories such as alternators, lube and scavenge pumps, hydraulic pumps, generators, etc.

Blower gearbox 133 can be mounted to interconnect gearbox 132 and can be configured to provide torque to a lubricant cooler blower fan, which may be used to draw in air to provide lubricant temperature reduction for lubrication system(s) (not shown) of tiltrotor aircraft 100. As noted, interconnect drive shaft 125 can be configured to provide a torque path that enables a single engine to provide torque to both propulsion systems 110 and 114 in the event of a failure of one of the engines.

Proprotor gearbox 141 may include various gears and/or gear systems, such as spiral bevel gears, planetary gear systems, etc. that can be configured to transfer torque and reduce rotational speed of engine inputs to mast 143, which may be mechanically coupled to the gear systems of the proprotor gearbox 141. The position of proprotor gearbox 141 may be rotatable about a conversion axis (generally indicated by dashed-line 223) to allow the proprotor gearbox 141 to be rotated (220) between the helicopter mode position (as shown at least in FIG. 1A) and the airplane mode position (as shown at least in FIGS. 1B and 2A).

In various embodiments, mast assembly 142 may include a housing and a mast bearing system that may provide various features as discussed herein including, but not limited to, securing the mechanical coupling between mast 143 and gear systems of proprotor gearbox 141 and providing structural and/or mechanical support for various aerodynamic and/or operational forces that the drive system 120 may be subjected to during operation of tiltrotor aircraft 100.

Referring to FIG. 2B, FIG. 2B is a simplified cross-sectional view diagram illustrating example details associated with second gearbox assembly 140, in accordance with certain embodiments. The cross-section of FIG. 2B is cut along a line generally indicated by the line labeled '2B' in FIG. 2A. As discussed previously, second gearbox assembly 140 may include proprotor gearbox 141 and mast assembly 142 that includes mast 143. In at least one embodiment, proprotor gearbox 141 may include a spiral bevel gear assembly 144, an oil pump 145, a high speed planetary gear system 146, and a low speed planetary gear system 147. Spiral bevel gear assembly 144 may include an input spiral bevel gear 148 and an output spiral bevel gear 149. In at least one embodiment, mast assembly 142 may include a housing 158, a mast bearing system 170, and a housing cap 159. Mast assembly 142 may be secured to proprotor gearbox 141 via housing using one or more fasteners 157. Housing cap 159 may be secured to housing 158 using one or more fasteners 161. Housing cap 159 may also include a mast seal 160 that may extend between the housing cap 159 and the outer diameter of mast 143. In various embodiments, mast seal 160 may be composed of an elastomeric material that may help to seal the components of the mast assembly 142 from environmental elements.

During operation, torque is input to proprotor gearbox 141 via a shaft (not shown) that mechanical couples input spiral bevel gear 148 to the gear train of the interconnect gearbox 132. The input spiral bevel gear 148 interfaces with output spiral bevel gear 149 to change the input torque by approximately ninety degrees to provide torque to mast 143 about the mast axis 222 via high speed planetary gear system 146 and low speed planetary gear system 147. Output spiral bevel gear 149 may further interface with a spiral bevel accessory drive 151, which may be used to provide power to an accessory device, such as oil pump 145.

In at least one embodiment, output spiral bevel gear 149 may be integrally formed with a sun gear 152 that provides input torque to high speed planetary gear system 146. In general, a planetary gear system is a high power density gear reduction system that provides for the ability to reduce the speed of input rotations to the gear system while increasing the torque of rotations output from the gear system.

In at least one embodiment, torque input to high speed planetary gear system 146 is transferred through the gear system (e.g., via planet gears, a ring gear, and a carrier, none of which are labeled for sake of brevity only) during which the speed of rotations is reduced while torque is increased. Torque output from the carrier of high speed planetary gear system 146 may be transferred to the sun gear (not labeled) of low speed planetary gear system 147. Torque input to low speed planetary gear system 147 is transferred through the gear system (e.g., via planet gears 153, a ring gear 154, and a carrier 155) during which the speed of rotations is reduced while torque is increased. Torque output from low speed planetary gear system 147 may be transferred to mast 143 via carrier 155, which may be mechanically coupled to mast 143. In at least one embodiment, mast 143 and carrier 155 may include splined portions (generally indicated by dashed-line circles 156) that may facilitate the mechanical coupling between mast 143 and carrier 155.

Various features provided by mast assembly 142 may facilitate securing the mechanical coupling between mast 143 and carrier 155 throughout dynamic changes in thrust that may be experienced by mast 143 during operation of tiltrotor aircraft 100. In general, positive thrust loads (e.g., caused by increasing thrust/accelerating rotations of mast 143) may result outward axial loads (generally indicated by arrow 224) that cause mast 143 to pull upward and away from proprotor gearbox 141. In contrast, negative thrust loads (e.g., caused by decreasing thrust/decelerating rotations of mast 143) may result in inward axial loads (generally indicated arrow 225) that may cause mast 143 to push inward and toward proprotor gearbox 141.

In addition, various features provided by mast assembly 142 may facilitate providing structural and/or mechanical support for various aerodynamic and/or operational forces that mast 143 may be subjected to during operation of tiltrotor aircraft 100. For example, aerodynamic forces and/or operational forces (e.g., that may be caused by dynamic thrust changes may cause various loads to be experienced by mast such as radial loads and/or shear loads, which may be caused by bending forces (generally indicated by arrows 226) that may be exerted on mast 143 during operation of tiltrotor aircraft 100 (e.g., during dynamic maneuvers of tiltrotor aircraft 100).

One conventional mast assembly has a mast bearing system having three bearing assemblies including an upper cylindrical roller bearing assembly and lower twin tapered roller bearing assemblies. While the conventional 3-bearing mast bearing system may provide sufficient support for reacting various aerodynamic and/or operational forces that may be experienced by a mast during operation, the upper cylindrical roller bearing assembly only reacts radial loads that may be experienced by the mast, while thrust loads may be reacted through the lower twin tapered roller bearing assemblies. Thus, support provided by the upper cylindrical roller bearing assembly may be limited throughout the overall range of forces that may be experienced by the mast during operation. Further, the upper cylindrical roller bearing assembly may increase part count, weight, and/or cost of the conventional mast assembly.

The present disclosure describes various embodiments that provide a mast assembly (e.g., mast assembly 142) in which a mast bearing system (e.g., mast bearing system 170) may be provided that may include an upper tapered bearing assembly, a lower tapered bearing assembly, and a pair of spacers between the upper and lower tapered bearing assemblies. In at least one embodiment, the bearing system may be pre-loaded in a duplex arrangement in which pre-loading for the bearing system may be provided by various features of the mast assembly including, a retaining device secured to the mast of the mast assembly, a housing cap secured to a housing of the mast assembly, a sleeve or liner between the housing and the upper and lower tapered bearing assemblies, and various structural features of the mast. As discussed in further detail herein, a mast bearing system including pre-loaded, duplex twin tapered roller bearing assemblies as discussed for various embodiments described herein may provide numerous advantages over conventional 3-bearing mast bearing systems.

Example embodiments associated with a mast bearing system including pre-loaded duplex, twin tapered roller bearing assemblies for a mast assembly of a tiltrotor aircraft are described below with more particular reference to the remaining FIGS. Although example embodiments discussed herein are described with reference to tiltrotor aircraft 100, it should be appreciated that tiltrotor aircraft 100 of FIGS. 1A-1B are merely illustrative of a variety of aircraft in which mast bearing systems including pre-loaded duplex, twin tapered roller bearing assemblies for mast assemblies may be used in accordance embodiments of the present disclosure. Other aircraft in which mast bearing systems including pre-loaded duplex, twin tapered roller bearing assemblies for mast assemblies may be used can include, for example, fixed wing airplanes, hybrid aircraft, unmanned aircraft, gyrocopters, a variety of helicopter configurations, and drones, among other examples.

Figure 3A:
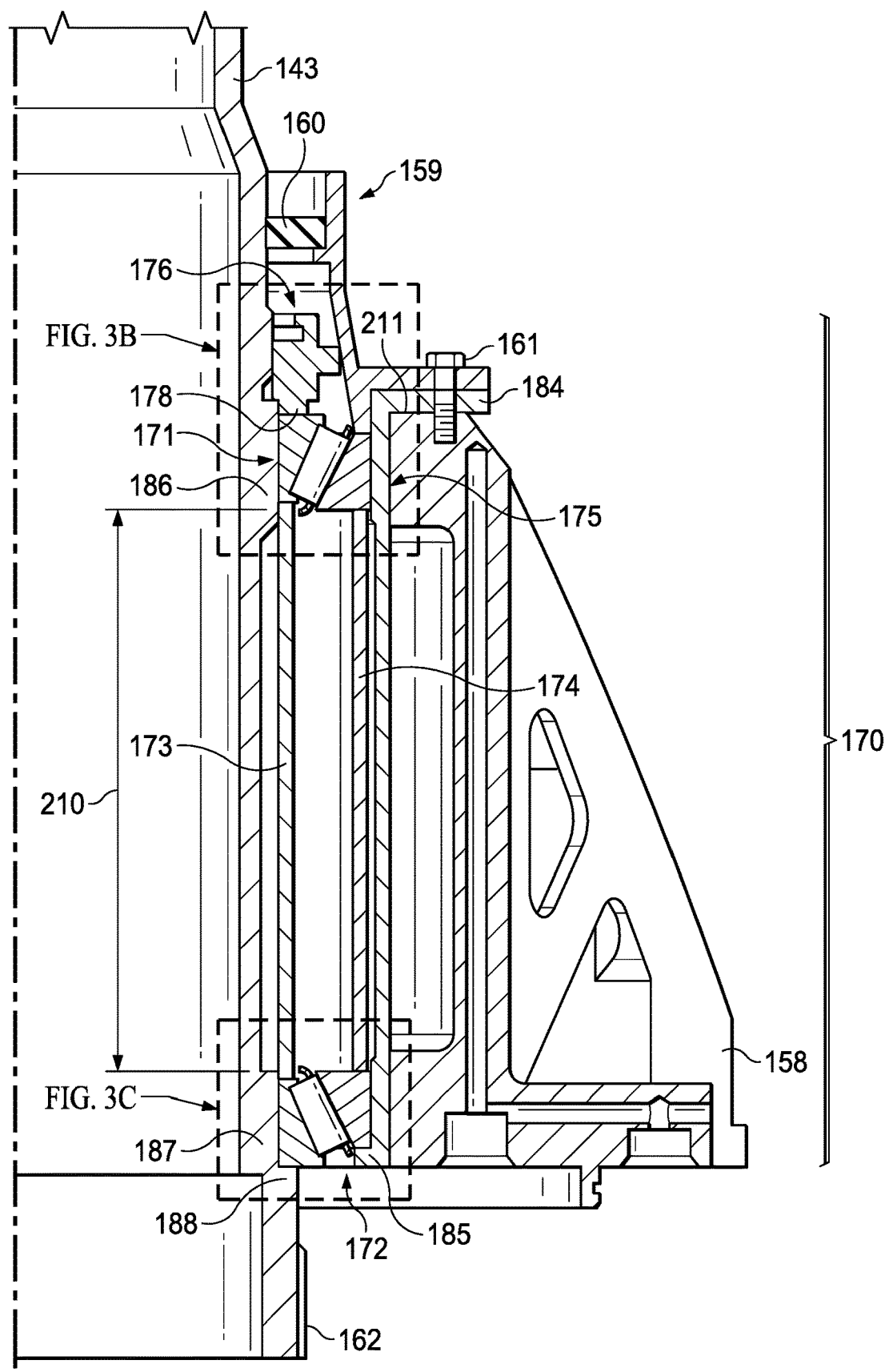
FIGS. 3A-3C are simplified diagrams illustrating example details associated with a mast assembly of the drive system, in accordance with certain embodiments.
Figure 3B:
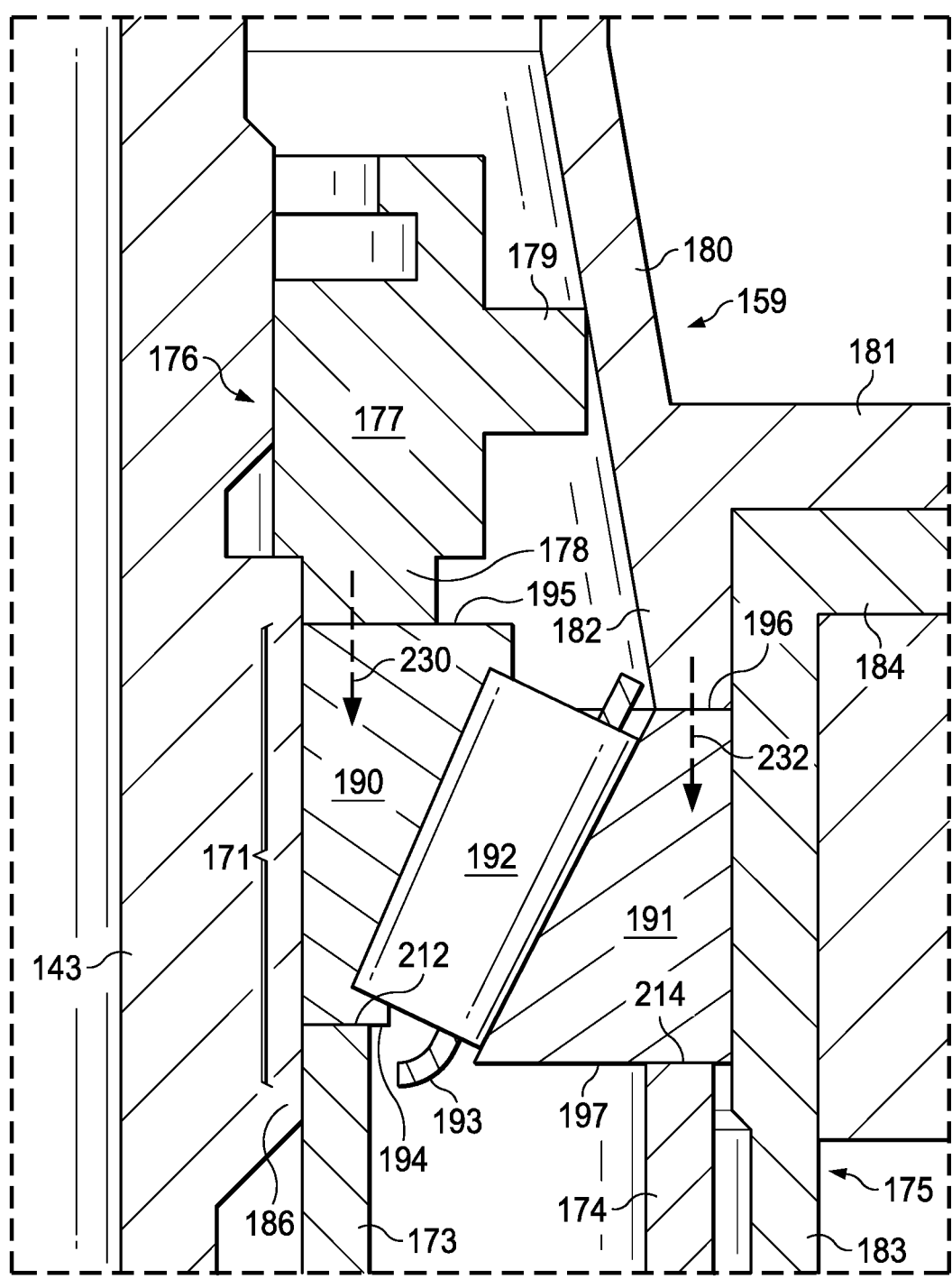
Figure 3C:
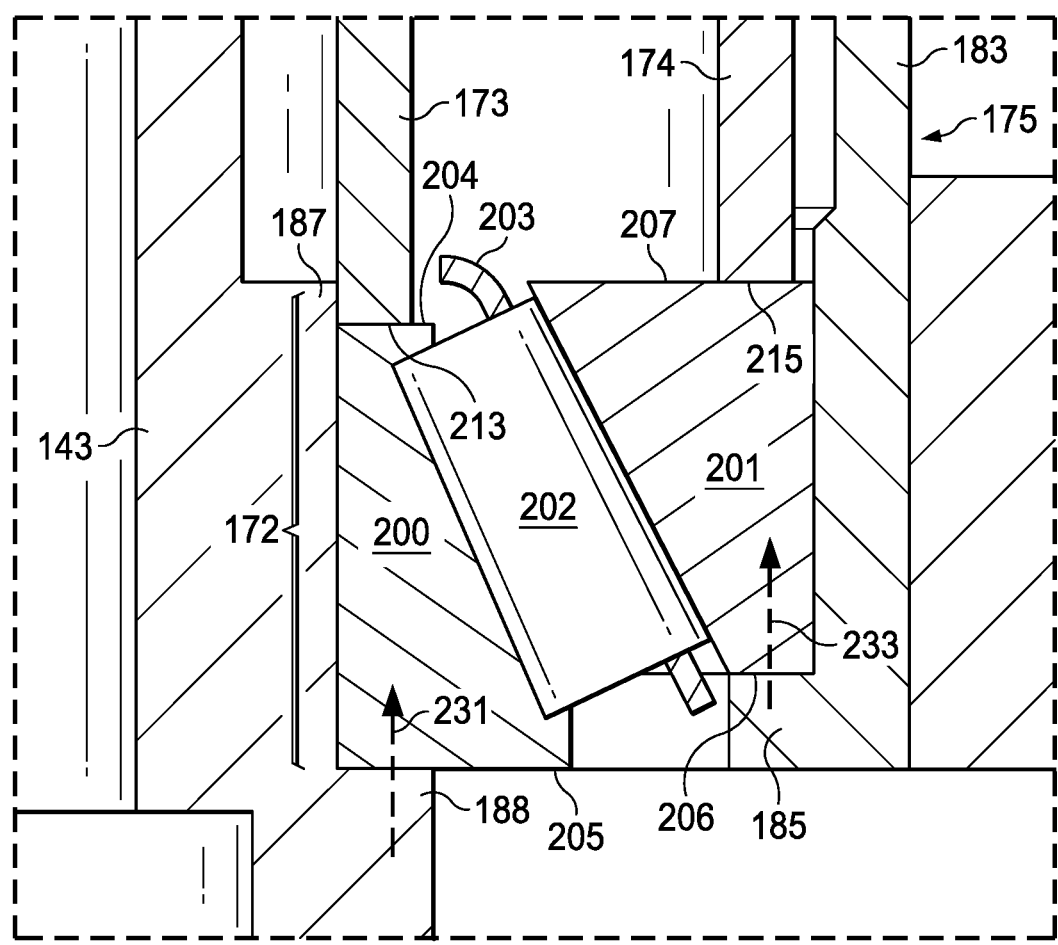

FIGS. 3A-3C are simplified diagrams illustrating example details associated with mast assembly 142 of drive system 120, in accordance with certain embodiments. FIG. 3A is a simplified partial cross-sectional view diagram illustrating example details associated with mast assembly 142 of drive system 120, in accordance with certain embodiments. FIG. 3B is a simplified partial side, cross-sectional view diagram illustrating example details of an upper tapered bearing 171 assembly of bearing system 170, in accordance with certain embodiments. FIG. 3C is a simplified partial side, cross-sectional view diagram illustrating example details of a lower tapered bearing assembly 172 of the bearing system 170, in accordance with certain embodiments. The partial cross-section of FIG. 3A is cut along a line generally indicated by the line labeled 3A in FIG. 2B, which aligns with the mast axis 222 of mast 143.

Mast assembly 142 may include housing 158, housing cap 159, mast bearing system 170, and mast 143. In at least one embodiment, mast bearing system 170 may include an upper tapered bearing assembly 171, a lower tapered bearing assembly 172, an inner spacer 173, an outer spacer 174, a sleeve or liner 175, and a retaining device 176. As referred to herein in this Specification, mast bearing system 170 may also be referred to interchangeably as 'bearing system 170'. Further as referred to herein in this Specification, 'upper tapered bearing assembly 171' may also be referred to interchangeably as 'upper bearing assembly 171' and 'lower tapered bearing assembly 172' may also be referred to interchangeably as 'lower bearing assembly 172'. In at least one embodiment, each of inner spacer 173, outer spacer 174, and liner 175 may have an overall cylindrical shape (e.g., from end to end) with various other features and/or elements as discussed for various embodiments described herein.

In accordance with various embodiments described herein, mast 143, housing cap 159, liner 175, and retaining device 176 may include various features and/or elements that may facilitate pre-loading the bearing system 170. Pre-loading the bearing system 170 may remove clearances that may be present in the upper bearing assembly 171 and the lower bearing assembly 172 when no pre-loading is applied. In the absence of pre-loading bearing system 170, it is possible that mast 143 could shift outward and inward in excess of several thousandths of an inch across changes between positive and negative thrust loads. Various features and/or elements that may facilitate pre-loading the bearing system 170 are discussed below in conjunction with FIGS. 3B-3C, which further illustrate various features, elements, and orientations of the bearing assemblies of bearing system 170.

As illustrated in FIG. 3B, upper bearing assembly 171 includes an inner race 190 (typically referred to as a 'cone'), an outer race 191 (typically referred to as a 'cup'), and a plurality of tapered roller bearings 192 between the inner race 190 and the outer race 191. A bearing cage 193 maintains separation and alignment of the plurality of tapered roller bearings 192 between the inner race 190 and the outer race 191. Inner race 190 has a front face 194 and a back face 195 and outer race 191 has a front face 196 and a back face 197. [Note, the orientation of front face and back face between the inner race and the outer race is 'flipped'.] As illustrated in FIG. 3C, lower bearing assembly 172 includes an inner race (cone) 200, an outer race (cup) 201, and a plurality tapered roller bearings 202 between the inner race 200 and the outer race 201. A bearing cage 203 maintains separation and alignment of the plurality of tapered roller bearings 202 between the inner race 200 and the outer race 201. Inner race 200 has a front face 204 and a back face 205 and outer race 201 has a front face 206 and a back face 207.

Inner spacer 173 may include a top end 212 and a bottom end 213 and outer spacer 174 may include a top end 214 and a bottom end 215. In at least one embodiment, retaining device 176 may include a main body portion 177, a lower retaining structure 178 that extends downward from the main body portion 177, and an upper cap support structure 179 that extends outward from the main body portion 177 (e.g., away from mast 143). In at least one embodiment, housing cap 159 may include a main body portion 180, a flange 181 that extends outward away from the main body portion 180 (e.g., away from mast 143), and a lower retaining structure 182 that extends downward from flange 181. In at least one embodiment, liner 175 may include a main body portion 183, an upper flange 184 that extends outward away from the main body portion 183 (e.g., away from mast 143), and a lower retaining structure 185 that extends inward away from the main body portion 183 (e.g., toward mast 143).

In at least one embodiment, the arrangement of the pre-loaded, duplex twin tapered roller bearings assemblies 171 and 172 may be configured in a back-to-back duplex arrangement. In some embodiments, tapered roller bearing assemblies 171 and 172 may be configured in a face-to-face duplex arrangement. For example, if bending stiffness of mast 143 is less important, a face-to-face duplex arrangement may be used. The upper bearing assembly 171 and the lower bearing assembly 172 may encircle mast 143 in the back-to-back duplex arrangement and may be separated by a separation distance 210 in which the separation distance may be provided by inner spacer 173 and outer spacer 174. The separation distance 210 may vary depending on several factors including, but not limited to, sizing of the upper and lower bearing assemblies 171, 172; sizing of the mast 143; expected loads on mast 143; expected rotations per minute (RPMs) of mast 143; overall packaging within the aircraft (e.g., interfacing with other systems such as control actuators, airframe structure, etc.); weight impacts associated with changes of other systems; combinations thereof; and/or any other design criteria.

In at least one embodiment, an upper journal 186 may be provided for mast 143 at a location at which upper bearing assembly 171 is to be seated around mast 143 and a lower journal 187 and a mast retaining structure 188 may be provided for mast 143 at a location at which lower bearing assembly 172 is to be seated around mast 143. The location of the upper journal 186 and the lower journal 187 may be set based on the separation distance 210 of the bearing assembly 170. The inner race 200 back face 205 of lower bearing assembly 172 may be in contact with and supported by mast retaining structure 188 in which the mast retaining structure 188 extends outward away from the lower journal 187 of mast 143. The outer race 201 front face 206 of lower bearing assembly 172 may be in contact with and supported by lower liner retaining structure 185. In at least one embodiment, upper journal 186, lower journal 187, and mast retaining structure 188 may be integral with mast 143; however, in other embodiments, these features may be formed separately from mast 143 and attached thereto (e.g., welded to the mast, bolted to the mast, etc.).

For the back-to-back duplex arrangement of the upper and lower bearing assemblies 171 and 172, the bottom end 213 of inner spacer 173 is in contact with the inner race 200 front face 204 of lower bearing assembly 172 and the top end 212 of inner spacer 173 is in contact with the inner race 190 front face 194 of upper bearing assembly 171. Further, the bottom end 215 of outer spacer 174 is in contact with the outer race 201 back face 207 of lower bearing assembly 172 and the top end 214 of outer spacer 174 is in contact with the outer race 191 back face 197 of upper bearing assembly 171.

In at least one embodiment, retaining device 176 and housing cap 159 may be used, at least in part, to provide pre-loading for the bearing system 170 to remove any clearances that may be present between the inner and outer races of each bearing assembly 171, 172. For example, during assembly of bearing system 170, lower retaining structure 185 of retaining device 176 may be directed into the inner race 190 back face 195 of upper bearing assembly 171 to secure the inner races 190 and 200 and the inner spacer 173 together, which also causes application of an inner, downward pre-load force (generally indicated by dashed-line arrow 230) on the bearing system 170 that is reacted by mast retaining structure 188 upward (generally indicated by dashed-line arrow 231) through bearing system 170 and back to retaining device 176. Using fasteners 161, housing cap 159 may be secured to housing 158 via housing cap flange 181 in which upper flange 184 of liner 175 is between the housing cap flange 181 and the top side 211 of housing 158. Securing the housing cap 159 to housing 158 further secures the outer races 191 and 201 and the outer spacer 174 together via lower retaining structure 182 of housing cap 159 that may be directed into the outer race 191 front face 196 of upper bearing assembly 171, which also causes application of an outer, downward pre-load force (generally indicated by dashed-line arrow 232) on the bearing system 170 that is reacted by lower liner retaining structure upward (generally indicated by dashed-line arrow 233) through bearing system 170 and back to housing 158. Thus, both retaining device 176 and housing cap 159 may be used to provide pre-loading for bearing system 170. In at least one embodiment, upper cap support structure 179 of retaining device 176 may provide structural support for the main body portion 180 of housing cap 159.

In various embodiments, retaining device 176 may be any device or combination of devices that may be used to secure and apply pre-loading to bearing system 170 and may include, but not be limited to, threaded rings, washers, spacers, tension clips or rings, lock clips or pins, combinations thereof, or the like. In various embodiments, fasteners 157 and 161 may be rivets, screws, bolts, washers, tension clips or rings, lock clips or pins, combinations thereof, or the like to provide a means for attaching housing 158 to proprotor gearbox 141 and attaching housing cap 159 to housing. In some embodiments, adhesive(s) and/or co-cured composite(s) may be used in addition to and/or in addition to using fasteners 157 and/or 161. In various embodiments, mast 143 may include threads, notches, holes, grooves, combinations thereof, and/or any other structural feature that may facilitate securing and applying pre-loading to bearing system 170.

It is to be understood that features and/or elements (e.g., races, bearings, retaining devices, spacers, liners, caps, structural features, gears, etc.) of a drive system, mast assembly, mast bearing system, etc. as discussed for various embodiments described herein may have any suitable dimensions, which may vary depending on applications and/or implementations (e.g., tapered bearing sizing, number of tapered bearings, bearing assembly inner/outer diameters, mast sizing, expected mast loads, expected mast RPMS, component materials, etc.). In various embodiments, tapered roller bearings 192 of upper bearing assembly 171 may be a same or different size than tapered roller bearings 202 of lower bearing assembly 172. Although only one row of tapered roller bearing 192 and 202, respectively, are illustrated for upper bearing assembly 171 and lower bearing assembly 172, respectively, it is to be understood that each bearing assembly can include any number of rows of tapered roller bearings.

Further, it is to be understood that the arrangement and/or configuration of features and/or elements of bearing system 170 and/or mast assembly 142 are provided for illustrative purpose only and are not meant to limit the broad scope of the present disclosure. For example, other sizes, shapes, configurations, arrangements, etc. of features and/or elements of bearing system 170 and/or mast assembly 142 may be adapted to be implemented for any other type of propulsion system in accordance with embodiments described herein. Other variations can be envisioned. Some of the features and/or elements illustrated in FIGS. 3A-3C are included in other ones of the remaining FIGS.; however, the discussion of these features and/or elements may not be repeated when discussing the remaining FIGS. for sake of brevity and any of these elements may take any of the forms disclosed herein.

Features and/or elements of drive system 120, proprotor gearbox 141, mast assembly 142, mast bearing system 170, mast 143, etc. as discussed for various embodiments described herein may be composed of any suitable material(s) including, but not limited to, a plastic, reinforced plastic, metal (e.g., aluminum, steel, etc.) and/or metal alloy, rubber, synthetic materials, fiberglass, reinforced fiberglass, ceramic materials, composite materials (e.g. a carbon composite such as a carbon fiber reinforced polymer (CFRP)), combinations thereof, or the like. In various embodiments, components of a drive system, mast assembly, mast bearing system, etc. as discussed for various embodiments described herein may be formed using any suitable technique including, but not limited to, composite fabrication and/or machining techniques, metal fabrication and/or machining techniques, combinations thereof, or the like.

The pre-loaded, duplex arrangement of twin tapered roller bearing assemblies 171 and 172 of mast bearing system 170 may allow numerous advantages over conventional 3-bearing mast bearing systems of conventional mast assemblies. One advantage of embodiments described herein may include mast bearing system 170 providing for the ability to support dynamic axial loads (e.g., inward and outward), radial loads, and/or shear loads that may be caused by dynamic changes in thrust using a bearing arrangement that utilizes fewer bearings than conventional 3-bearing mast bearing systems, which can result in lower weight, part count, and/or cost in comparison to such conventional 3-bearing mast bearing systems. In particular, lower bearing assembly 172 may react any positive thrust loads as well as any radial loads and/or shear loads while upper bearing assembly 171 may react any negative thrust loads as well as any radial and/or shear loads that may be experienced by mast 143. Additionally, the twin tapered duplex arrangement of upper and lower bearing assemblies 171 and 172 may advantageously carry much higher thrust and/or bending loads for a given assembly size/weight in comparison to other bearing types such as spherical bearings or conventional roller bearings.

One other advantage of embodiments described herein may include that the pre-loaded, duplex twin taper arrangement as well as the separation distance 210 provided by inner/outer spacers 173/174 between the upper and lower bearing assemblies 171 and 172 may increase the overall bending stiffness of mast 143 in comparison to mast bending stiffness provided by conventional mast bearing systems. Typically, the lower bearing assembly in conventional 3-bearing mast bearing systems only has the ability to handle shear loads. However, for bearing system 170, upper bearing assembly 171, when pre-loaded with the lower bearing assembly 172 and separated by a given separation distance 210, can resist bending of the mast 143 more than the lower bearing assembly 172; thus, the effective stiffness of the mast 143 as well as the mast assembly 142 and the drive system 120, in general, is higher in comparison to the bending stiffness that is typically provided by conventional mast bearing systems. Generally, a higher bending stiffness of drive systems is desirable for aircraft, such as tiltrotor aircraft (e.g., tiltrotor aircraft 100), that have higher maneuverability than conventional rotorcraft. Other advantages may be realized by mast assembly 142 and/or bearing system 170, as discussed in further detail herein.

Referring to FIGS. 4A-4B, FIGS. 4A-4B are simplified exploded view diagrams illustrating example details associated with upper bearing assembly 171 (FIG. 4A) and lower bearing assembly 172 (FIG. 4B), in accordance with certain embodiments.

FIG. 4A illustrates upper bearing assembly 171, which may include inner race (cone) 190 and outer race (cup) 191 with tapered roller bearings 192 and bearing cage 193 between the inner race 190 and the outer race 191. Upper bearing assembly 171 may have any suitable dimensions and/or features (e.g., number of bearings, etc.). For example, in at least one embodiment, inner race 190 may have a bore 216 and outer race 191 may have an outer diameter 217 that may ensure a suitable fit (e.g., within certain design tolerances, criteria, etc.) for the upper bearing assembly 171 between the upper journal 186 of mast 143 and liner 175.

FIG. 4B illustrates lower bearing assembly 172, which may include inner race (cone) 200 and outer race (cup) 201 with tapered roller bearings 202 and bearing cage 203 between the inner race 200 and the outer race 201. Lower bearing assembly 172 may also have any suitable dimensions and/or features. For example, in at least one embodiment, inner race 200 may have a bore 218 and outer race 201 may have an outer diameter 219 that may ensure a suitable fit (e.g., within certain design tolerances, criteria, etc.) for the lower bearing assembly 172 between the lower journal 187 of mast 143 and liner 175. As noted, bearing cage 193 maintains separation and alignment of the tapered roller bearings 192 between the inner race 190 and outer race 191 for upper bearing assembly 171 and bearing cage 203 maintains separation and alignment of tapered roller bearings 202 between the inner race 200 and the outer race 201 for lower bearing assembly 172.

Figure 5:
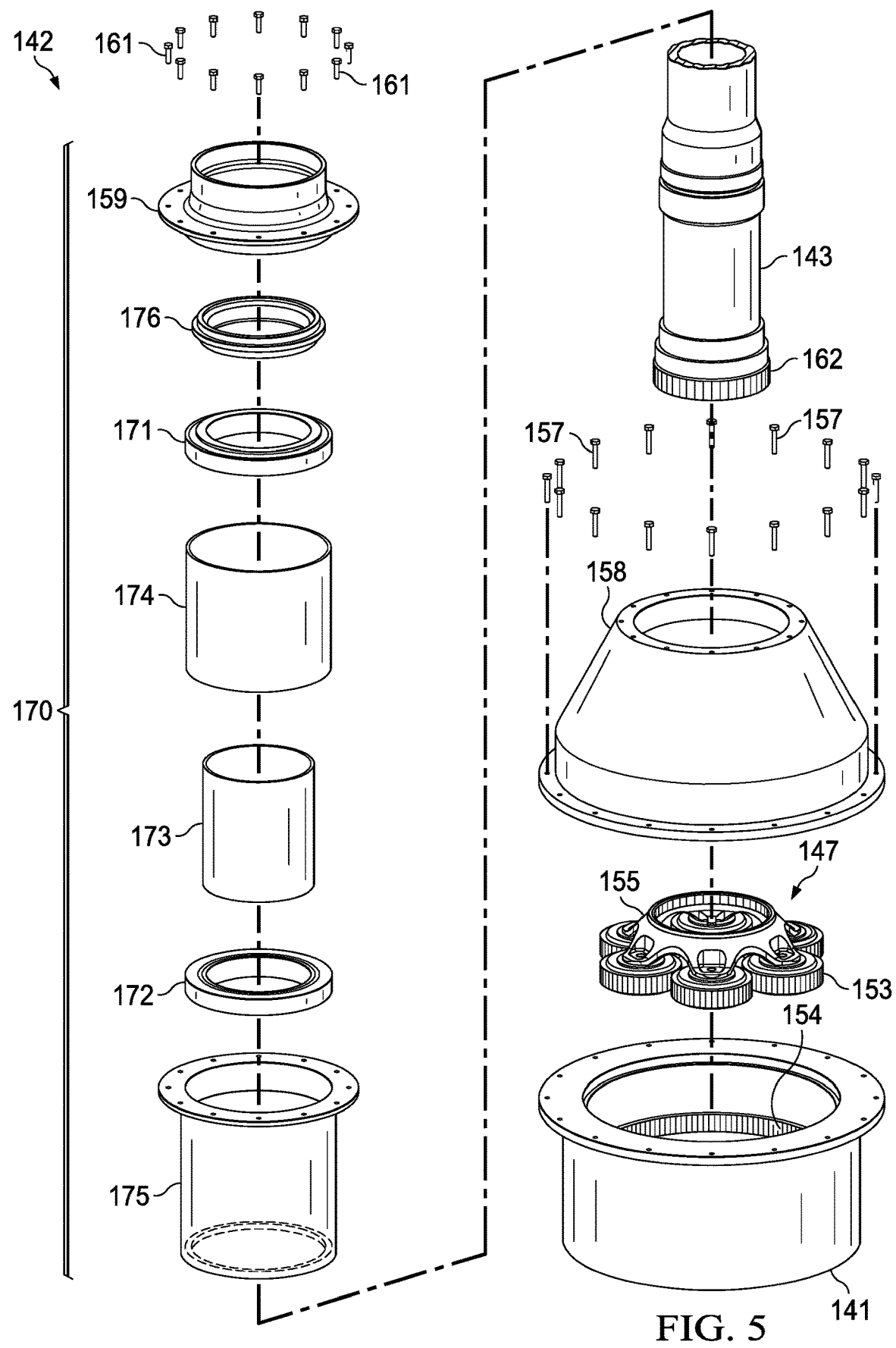
FIG. 5 is a simplified exploded view diagram illustrating other example details associated with the mast assembly of the drive system, in accordance with certain embodiments.

Referring to FIGS. 5-6, FIG. 5 is a simplified exploded view diagram illustrating other example details associated with mast assembly 142 for drive system 120, in accordance with certain embodiments; and FIG. 6 is a simplified flowchart 600 illustrating example details associated with assembling mast bearing system 170 for mast assembly 142, in accordance with certain embodiments. FIG. 5 will be discussed in parallel with flowchart 600 of FIG. 6.

FIG. 5 includes mast assembly 142, which may include housing 158, housing cap 159, bearing system 170, and mast 143. Also shown in FIG. 5 is low speed planetary gear system 147 including carrier 155; a dashed-line representation of proprotor gearbox 141 is also illustrated. Note, mast 143 is only partially illustrated in FIG. 5.

In addition to various advantages discussed above, mast assembly 142 and/or mast bearing system 170 may also provide assembly and/or disassembly advantages over conventional mast bearing systems and/or conventional mast assemblies, in accordance with certain embodiments. One advantage of embodiments described herein may include that bearing system 170 may be assembled or disassembled from the top side (211) of housing 158, which may reduce manufacturing and/or maintenance time, costs, etc. in comparison to conventional mast bearing systems that are often assembled and disassembled from the bottom side of the housing and/or require full or partial disassembly of the proprotor gearbox. Yet another advantage of embodiments described herein may include that mast 143 may be removed from the top side (211) of housing 158 without removing of housing 158 from proprotor gearbox 141 and without disassembling proprotor gearbox 141, which may further reduce maintenance time, costs, etc. in comparison to conventional mast bearing systems in which removal of the mast typically involves removal of the housing and full or partial disassembly of the proprotor gearbox.

A method of assembling bearing system 170 is now described via flowchart 600, in accordance with at least one embodiment of the present disclosure. For flowchart 600 it is assumed that housing 158 has been secured (e.g., via fasteners 157) to proprotor gearbox 141. In at least one embodiment, flowchart 600 may begin at 602 by mechanically coupling mast 143 to low speed planetary gear system 147 of proprotor gearbox 141. In at least one embodiment, the mechanical coupling may be provided by mating splines 162 of mast 143 to splines of carrier 155 of the low speed planetary gear system 147.

The flowchart may proceed to 604 by providing liner 175 within housing 158 in which the upper flange 184 of liner 175 is seated on the top side 211 of housing 158. In some embodiments, liner 175 may be provided by sliding liner 175 around mast 143 (if mast 143 is already mechanically coupled to low speed planetary gear system 147) and into housing 158 until the upper flange 184 of liner 175 seats on the top side 211 of housing; however, in other embodiments, liner 175 may be provided within housing 158 before mast 143 is mechanically coupled to low speed planetary gear system 147 (e.g., 604 may be performed before 602).

The flowchart may proceed to 606 by inserting lower tapered bearing assembly 172 (into housing 158) between liner 175 and mast 143. The lower tapered bearing assembly 172 may be inserted (606) with its outer race 201 back face 207 oriented upward toward the top side 211 of housing 158. In at least one embodiment, the inserting (606) may include sliding lower tapered bearing assembly 172 (in the corresponding orientation) around mast 143 and into housing 158 until the outer race 201 front face 206 is in contact with the lower retaining structure 185 of liner 175 and the inner race 200 back face 205 is in contact with mast retaining structure 188.

The flowchart may proceed to 608 by inserting inner spacer 173 and outer spacer 174 (into housing 158) between liner 175 and mast 143. In at least one embodiment, the inserting (608) may include sliding inner spacer 173 and outer spacer 174 around mast and into housing 158 until the bottom end 213 of inner spacer 173 and the bottom end 215 of outer spacer 174 are in contact with the lower tapered bearing assembly 172.

The flowchart may proceed to 610 by inserting upper tapered bearing assembly 171 (into housing 158) between liner 175 and mast 143. The upper tapered bearing assembly 171 may be inserted (610) with its outer race 191 back face 197 oriented downward away from the top side 211 of housing 158 (e.g., toward proprotor gearbox 141). In at least one embodiment, the inserting (610) may include sliding upper tapered bearing assembly 171 (in the corresponding orientation) around mast 143 and into housing 158 until the outer race 191 back face 197 is in contact with the top end 214 of outer spacer 174 and the inner race 190 front face 194 is in contact with the top end 212 of inner spacer 173.

The flowchart may proceed to 612 by securing the lower tapered bearing assembly 172, the inner spacer 173, the outer spacer 174, and the upper bearing assembly 171 together to preload the upper and lower bearing assemblies 171 and 172. In at least one embodiment, the securing (612) may include securing retaining device 176 to mast 143 in order to 'clamp-up' the inner races of assemblies 171 and 172 together and then securing housing cap 159 to housing 158 (e.g., via fasteners 161) to clamp-up the outer races of assemblies 171 and 172 together in order to pre-load bearing system 170 such that any internal clearances may be removed from the assemblies 171 and 172. Following the securing (612), the flowchart may be complete.

Thus, as illustrated in FIG. 5 and flowchart 600 of FIG. 6, mast assembly 142 and bearing system 170 may advantageously provide for the ability to assemble bearing system 170 from the top side of housing 158.

Referring to FIG. 7, FIG. 7 is a simplified flowchart 700 illustrating example details associated with removing mast 143 from drive system 120, in accordance with certain embodiments. As discussed above, mast assembly 142 may advantageously provide for the ability to remove mast 143 and/or bearing system 170 from drive system 120 via the top side 211 of housing 158 without removing housing 158 from proprotor gearbox 141 and/or without disassembling proprotor gearbox 141.

In at least one embodiment, the flowchart may begin at 702 by removing housing cap 159 from housing 158 (e.g., removing fasteners 161 and pulling housing cap 159 from housing 158). The flowchart may proceed to 704 by removing mast 143 from drive system 120. In at least one embodiment, mast 143 may be removed from drive system 120 by pulling mast 143 away from drive system 120 (e.g., using a machine, etc.) via the top side 211 of housing 158.

In at least on embodiment, pulling mast 143 from drive system 120 may also remove lower bearing assembly 172, inner and outer spacers 173 and 174, upper bearing assembly 171, and retaining device 176 (if not already removed) from housing 158 along with mast 143. Depending on clearances, tightness, etc. between liner 175 and housing 158 and/or between liner 175 and the upper and/or lower bearing assemblies 171 and/or 172, liner 175 may also shift or be pulled from housing 158 when mast 143 is pulled from drive system 120.

In some embodiments, the flowchart may proceed to 706 by removing one or both bearing of upper and/or lower assemblies 171 and/or 172 from mast 143. For example, in some embodiments, retaining device 176 may be unsecured from mast 143 and one or both of upper and/or lower bearing assemblies 171 and/or 172 in a reverse order of the assembly of bearing system 170.

It is to be understood that the example arrangements and/or configurations of various features and/or elements associated with a mast bearing system discussed in FIGS. 2A-2B, 3A-3C, 4A-4B, and 5-7 are only a few of the many possible arrangements and/or configurations of features and/or or elements that may be provided for such bearing systems and are not meant to limit the broad scope of the present disclosure. Virtually any arrangement and/or configuration of features and/or elements may be provided for a mast bearing system having pre-loaded, duplex twin tapered roller bearing assemblies in which the tapered roller bearing assemblies may be separated by a separation distance and, thus, are clearly within the scope of the present disclosure.

The diagrams in the FIGS. illustrate the architecture, functionality, methods, and/or operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method of assembling a bearing system for a mast of a tiltrotor aircraft, the method comprising:
    coupling the mast to a gear system of a gearbox of the tiltrotor aircraft;
    providing a liner between the mast and a housing, wherein the liner comprises an upper flange that extends outward away from the mast and a lower retaining structure that extends inward toward the mast;
    inserting a lower tapered bearing assembly between the liner and the mast;
    inserting an inner spacer and an outer spacer between the liner and the mast;
    inserting an upper tapered bearing assembly between the liner and the mast; and
    securing the lower tapered bearing assembly, the inner spacer, the outer spacer, and the upper tapered bearing assembly together.

2. The method of claim 1, wherein the lower tapered bearing assembly comprises an inner race and an outer race, and the inner race is in contact with a retaining structure of the mast and the outer race is in contact with the lower retaining structure of the liner.

3. The method of claim 2, wherein the upper tapered bearing assembly comprises an inner race and an outer race.

4. The method of claim 3, wherein the securing further comprises:
    securing a retaining device to the mast, wherein the retaining device is in contact with the inner race of the upper tapered bearing assembly; and
    securing a housing cap to the housing, wherein the housing cap is in contact with the outer race of the upper tapered bearing assembly.

5. The method of claim 4, wherein the inner spacer is in contact with the inner race of the lower tapered bearing assembly and the inner race of the upper tapered bearing assembly.

6. The method of claim 4, wherein the outer spacer is in contact with the outer race of the lower tapered bearing assembly and the outer race of the upper tapered bearing assembly.

7. The method of claim 1, wherein each of inserting the lower tapered bearing assembly, inserting an inner spacer and an outer spacer, and inserting the upper tapered bearing assembly are performed from a top side of the housing.

* * * * *